US006347374B1

(12) United States Patent
Drake et al.

(10) Patent No.: US 6,347,374 B1
(45) Date of Patent: Feb. 12, 2002

(54) EVENT DETECTION

(75) Inventors: David L. Drake, San Diego; David J. Webster, Temecula, both of CA (US)

(73) Assignee: Intrusion.com, Inc., Richardson, TX (US)

( * ) Notice: Subject to any disclaimer, the term of this patent is extended or adjusted under 35 U.S.C. 154(b) by 0 days.

(21) Appl. No.: 09/092,660

(22) Filed: Jun. 5, 1998

(51) Int. Cl.[7] ................................................. H04L 9/00
(52) U.S. Cl. ......................... 713/200; 713/201; 709/224
(58) Field of Search ......................... 709/224; 713/200, 713/201

(56) References Cited

U.S. PATENT DOCUMENTS

| | | | |
|---|---|---|---|
| 3,931,504 A | 1/1976 | Jacoby | 235/153 |
| 4,141,006 A | 2/1979 | Braxton | 340/505 |
| 5,032,979 A | * 7/1991 | Hecht et al. | 364/200 |
| 5,278,901 A | 1/1994 | Shieh et al. | 380/4 |
| 5,440,723 A | 8/1995 | Arnold et al. | 395/181 |
| 5,557,742 A | 9/1996 | Smaha et al. | 395/186 |
| 5,621,889 A | 4/1997 | Lermuzeaux et al. | 395/186 |
| 5,758,069 A | * 5/1998 | Olsen | 395/187.01 |
| 5,909,493 A | * 6/1999 | Motoyama | 380/25 |
| 6,052,729 A | * 4/2000 | Robinson | 709/224 |

OTHER PUBLICATIONS

Henry F. Korth, "Database System Concepts", 2 nd ed., McGraw–Hill, Inc., Jan. 1991.*
George Coulouris, "Distributed Systems", 2 nd edition, Addison–Wesley, Jan. 1994.*

* cited by examiner

Primary Examiner—Thomas R. Peeso
Assistant Examiner—Todd Jack
(74) Attorney, Agent, or Firm—Brobeck, Phleger & Harrison, LLP

(57) ABSTRACT

A system for event detection employs a collector that collects raw audit data made up of raw audit data records at an audit source; a database; an inserter at a downstream processing location that inserts Virtual Records into the database, including both a first type of Virtual Record generated in response to a raw audit data record, and a second type of Virtual Record generated in response to a detected audit event; the inserter; a parser; coupled to the collector, that converts raw audit data records in the raw audit data into Virtual Records; a detector that detects audit events in response to the Virtual Records generated by the parser, and generates the second type of Virtual Record in the event an audit event is detected.

42 Claims, 2 Drawing Sheets

EVENT DETECTION

BACKGROUND OF THE INVENTION

The present invention relates to event detection, and more particularly to a computerized system and method for detecting events based on audit data received from one or more audit sources. Even more particularly, the present invention relates to the detection of intrusion or misuse event detection in a distributed computer network environment based on audit data generated at one or more audit sources, such as operating systems running at remote computer installations.

Misuse detection is the process of detecting and reporting uses of systems that would be deemed inappropriate or unauthorized if known to the responsible parties. Even though designers, owners, and administrators of such systems usually try to prevent misuses, the complexity of modern system environments and the difficulty of preventing authorized users from abusing their privileges makes it virtually impossible to anticipate and prevent all possible security problems. To date, however, there is no known system or method for effectively and independently detecting and reporting misuses and facilitating their subsequent investigation.

This misuse detection and reporting research has followed two basic approaches: anomaly detection systems and expert systems, with the overwhelming emphasis on anomaly detection.

Anomaly detection looks for statistically anomalous behavior. It assumes that intrusions and other security problems are rare and that they appear unusual when compared to other user behavior. D. Denning, "An Intrusion Detection Model," Proc 1986 IEEE Symp. Security & Privacy, (April 1986) provides an anomaly detection model (hereinafter the "Denning Model") for detecting intrusions into computer systems. The Denning Model uses statistical profiles for user, dataset, and program usage to detect "exceptional" use of the system.

There are variations of the Denning Model of anomaly detection models and different applications of these models.

Expert systems (also known as rule-based systems or production systems) also have had some use in misuse detection, generally as a layer on top of anomaly detection systems for interpreting reports of anomalous behavior.

S. Snapp, et al., "DIDS (Distributed Intrusion Detection System)" Proc. 14th Nat'l Computer Security Conf., Washington, D.C. (October 1991) describes one example of an expert system signature analysis model that detects misuse by looking for one specific event within a specific system context.

In general, a computer event detection system is designed to protect a computer installation, with which it is associated, against abnormal computer actions of users (i.e., both insiders who are entitled to use the computer installation normally and outsiders who have intruded into the computer installation), whenever such actions are likely to give rise directly or indirectly to a breach of confidentiality, of integrity, and/or of availability of data and services from the computer installation.

The direct financial impact of computer misuse is very high and increasing. The National Institute of Justice (NIJ), for example, estimates the cost of computer misuse in the U.S. during 1993 to range from $500 million to $5 billion dollars. In addition, NIJ estimates that $2.1 billion was lost in the same period from telephone service fraud through illegally manipulating telephone company computer systems. In fact, virtually every sector of modern commerce and government, from banking to national defense, depends on the security of processing systems on which the sectors rely. As an increasing number of organizations connect their internal networks to outside public networks (e.g. the Internet, "National Information Infrastructure", etc.), the potential importance of misuse increases. This is because vulnerability increases with increased exposure.

Processing system misuse detection and reporting research has been funded by U.S. government agencies who have concerns for the confidentiality of their computer systems. Researchers have generally been associated with large research organizations or national laboratories. These institutions have required detailed knowledge of technical computer security, known threats and vulnerabilities, protection mechanisms, standard operational procedures, communications protocols, details of various systems' audit trails, and legal investigation of computer crimes.

A computer event detection system, as mentioned above, is designed to detect abnormal computer actions constituting intrusions of insiders and a fortiori of intruding outsiders, and also to detect the people involved in such intrusions or suspected of being so involved.

Numerous present-day computer installations, whether they have centralized processor units or are they organized in networks of interconnecting geographically distributed processor units, have various access points for serving their users. The number of such points and the ease with which they are often accessible, as well as the requirements necessary for running such computer installations, have the drawback of facilitating attempts at intrusion by people who are not authorized users, and attempts by users of any kind, whether acting alone or in concert, to perform potentially harmful computer operations.

It is known that detecting intrusions into a computer installation and identifying the users performing illegal actions can be attempted by an approach that is statistical or neural, as mentioned above, or based on an expert system, as also mentioned above.

U.S. Pat. No. 5,557,742 (Smaha et al.), incorporated herein by reference, describes a method and system for detecting intrusion and misuse of data processing systems. The system uses processing system inputs, which include processing system audit trail records, system log file data, and system security state data information to detect and report processing system intrusions and misuses. A misuse selection mechanism allows the detection system to analyze the process inputs for a selected subset of misuses. The processing system inputs are then converted into states that are compared, through the misuse engine, to a predefined set of states and transitions until a selected misuse is detected. Once a misuse has been detected, an output mechanism generates a signal for use by a notification and storage mechanism. The detection system then generates a text-based output report for a user to view or store.

A number of false positives is minimized by creating signatures from undesirable activities including known attack outcomes, known system vulnerabilities and known attack procedures. Misuse is only reported upon a direct match to a known misuse signature; the probability of falsely reporting a misuse is reduced over the previous anomaly detection mechanisms. The signatures are generated by a programmer and are loadable at program initiation. System programmers are capable of creating their own misuse signatures from their particular known attack procedures, attack outcomes, and known system vulnerabilities. The misuse signatures are deterministic, unlike expert systems. The system does not use statistical analysis.

U.S. Pat. No. 5,621,889 (Lermuzeaux, et al.), incorporated herein by reference, describes a facility for detecting intrusions and possibly suspect users, by making use of streams of surveillance data relating to the operation of a computer installation and in particular to the actions of users of the installation, wherein the actions take place at installation level. The detection facility involves modeling a target as constituted by the computer installation and its users and also their respective behaviors by making use of previously acquired knowledge and rules and by making use of a symbolic representation using a semantic network; comparing the modeled behavior of the installation and its users with normal behavior expected for the same conditions as modeled by the behavior rules and security rules contained in a knowledge base, and inferring therefrom either an anomaly object in the event of at least one of the behavior rules being violated, or an intrusion object or an intrusion hypothesis object in the event of at least one of the security rules being violated; interpreting the anomalies observed by implementing the previously acquired rules and knowledge so as to generate, reinforce, or confirm corresponding intrusion hypotheses; correlating and interpreting intrusion hypotheses and intrusions observed by implementing the previously acquired rules and knowledge in order to link together various intrusion hypotheses and/or intrusions, and to infer new intrusion hypotheses and/or intrusions therefrom; and co-operating with the various other steps above to indicate the various data items that the various other steps above produce relating to behavior, anomalies, intrusion hypotheses, and intrusions.

The present invention advantageously addresses a need for improvements in event detection systems.

SUMMARY OF THE INVENTION

The present invention advantageously improves upon heretofore known event detection systems by providing an event detection system, and more particularly a computerized event detection system that detects events based on a plurality of detection models in a highly secure distributed processing environment based on audit data received from one or more audit sources.

The present invention in one embodiment, can be characterized as a system for event detection. Such system employs a collector that collects raw audit data made up of raw audit data records at an audit source; a database; an inserter at a downstream processing location that inserts Virtual Records into the database, including both a first type of Virtual Record generated in response to a raw audit data record, and a second type of Virtual Record generated in response to a detected audit event, the inserter; a parser, coupled to the collector, that converts raw audit data records in the raw audit data into Virtual Records; a detector that detects audit events in response to the Virtual Records generated by the parser, and generates the second type of Virtual Record in the event an audit event is detected.

In a variation of the system of the one embodiment, the system further employs a sender coupled to at least one of the collectors, the parser, and the detector, at the audit source, for sending output data from at least one of the collectors, the parser, and the detector to a downstream process location.

In an additional variation of the system of the one embodiment, the sender includes an encryptor for encrypting output data from at least one of the collectors, the parser, and the detector before the output data is sent to the downstream process location.

In a further variation of the system of the one embodiment, the detector is coupled to an output of the parser, and the detector detects audit events in response to the Virtual Records generated by the parser and generates Virtual Records of the second type in response thereto.

In yet another further variation of the system of the one embodiment, an input of the detector is coupled to an output of the database, and the detector detects audit events in response to the Virtual Records in the database, and generates Virtual Records of the second type in response thereto. Also, an output of the detector may be coupled to the inserter, so that Virtual Records of the second type generated by the detector are inserted into the database by the inserter.

In another further variation, an output of said detector is coupled to the inserter, and Virtual Records of the second type generated by the detector are inserted into the database by the inserter.

In an additional variation, the event detection system also includes a user interface coupled to the database. The user interface filters Virtual Records in the database based on a filter criteria.

In variations, the detector may perform rule-based analysis of the Virtual Records generated by the parser, and/or may perform statistical analysis of the Virtual Records generated by the parser. When performing statistical analysis, the detector determines a mean and a standard deviation of a parameter in a set of the Virtual Records, and detects in a subsequent Virtual Record whether the parameter is more than a predetermined multiple of the standard deviation away from the mean.

In another embodiment, the present invention can be characterized as a method of event detection. The method includes steps of collecting, using a collector at an audit source, raw audit data comprising raw audit data records and communicating the raw audit data to the parser; parsing, using the parser, the raw audit data records by converting each raw audit data record into a Virtual Record of a first type and communicating the Virtual Records to a detector; detecting, using the detector, audit events in response to the Virtual Records generated by the parser, and generating a Virtual Record of a second type in response to each detected audit event and communicating the Virtual Records to an inserter; and inserting, using the inserter, Virtual Records of the first type and Virtual Records of the second type into a database.

In a variation of the method, output data from at least one of the collector, the parser and the detector may be encrypted before communicating the output to a downstream process location.

In further variations of the method, rule-based analysis and/or statistical analysis is performed on the Virtual Records. The statistical analysis may be include determining a mean and a standard deviation of a parameter in a set of Virtual Records; and determining whether in a subsequent Virtual Record the parameter is more than a predetermined multiple of the standard deviation away from the mean.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
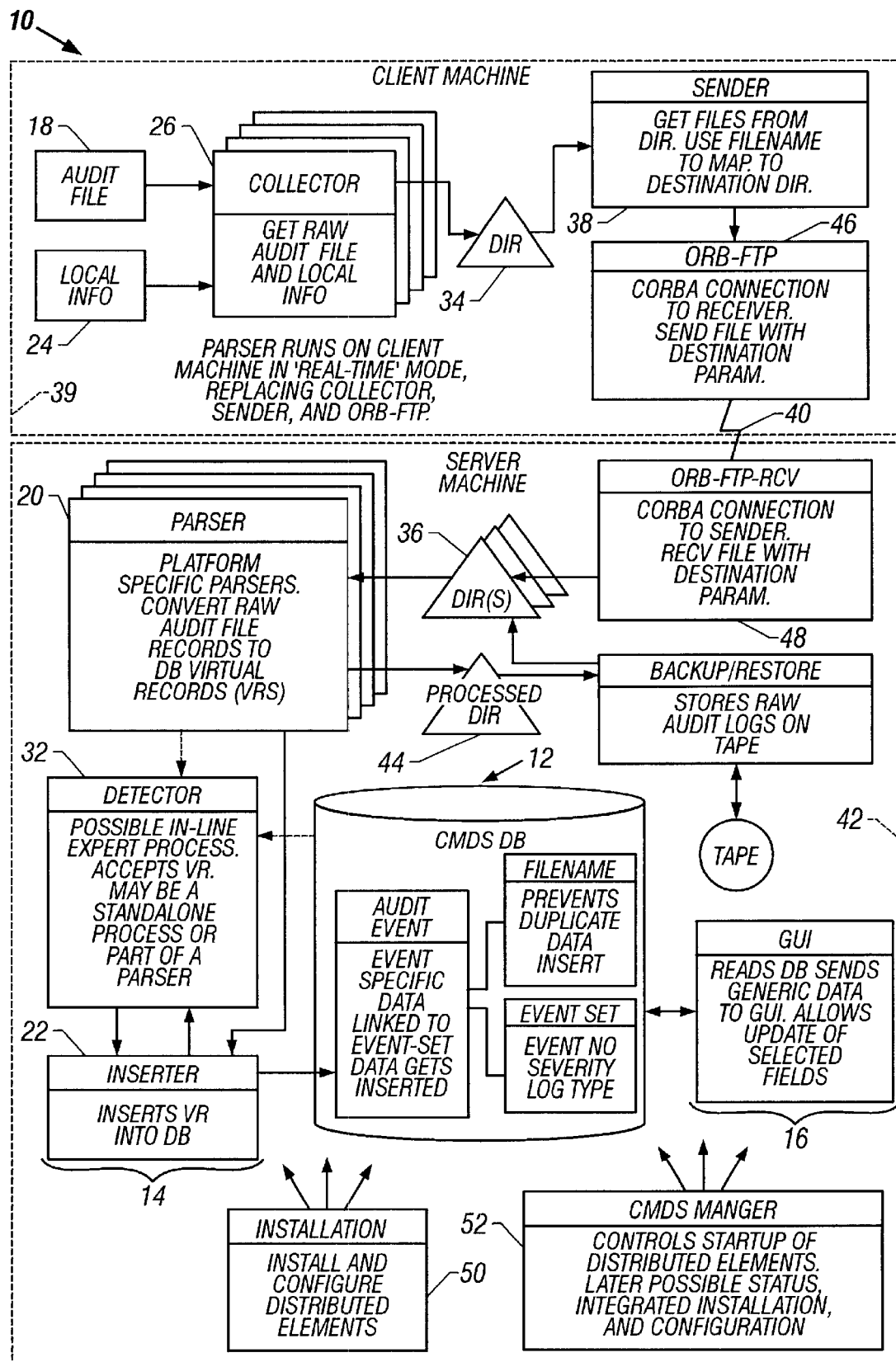
FIG. 1 is a schematic block diagram of an event detection system of one embodiment in accordance with the present invention.

Referring first to FIG. 1, a block diagram is shown of an event detection system 10 and method in accordance with one embodiment of the present invention. The event detection system 10 is based on a generalized database storage architecture, which can be viewed as a dual three-tiered implementation with a database 12 in the middle. On one side is an audit analysis engine 14, which converts raw audit data into a standardized format, and performs expert system analysis on the data. On the other side is a user interface 16, which consists of management and control functions, and an application user interface that provides data mining tools to the use of the invention referred to herein as the event detection system.

The event detection system's audit analysis is broken into sequential process blocks: (1) audit acquisition and parsing; (2) rule-based processing; and (3) statistical processing.

Specifics of implementation of these sequential processes, within the context of the present embodiment, varies, based on an audit source 18 being analyzed. For example, the audit source 18 may be security, system, and/or application logs maintained by an operating system. These logs contain raw information on file access, login attempts, application functions, and the like. By way of further example, the audit source 18 may be logs maintained by magnetic card entry systems, fingerprinting scanners, retinal scanners, bar code scanners, or the like. These logs contain raw information on person, product, machine, vehicle and/or device movements, accesses, and the like. By way of additional example, the audit source 18 (or date source) may be any of the many known sensors, alarms, seismic activity monitors, weather monitors, Global Positioning System (GPS) receivers, temperature and/or humidity monitors, and the like now available or to be available commercially. The only criterion for the audit source 18 is that it generates a record of some monitored condition. In the exemplary case below, operating system logs are set forth as one type of audit source 18 with which the present embodiment finds utility. The underlying system and methods of the present embodiment, however, should be applicable to many types of audit sources. A general description of each of the major process blocks illustrated follows.

The event detection system uses commercial off-the-shelf relational databases 12 to store events. Events are preferably stored in relational databases 12 in a normalized format, i.e., standard, that maximizes storage capacity and flexibility. The normalized format also simplifies analysis of events, in that no matter what the audit source 18, the events are represented in a single format.

Events from raw audit streams (or, files, or logs), as generated by the audit source 18, are processed through a variety of process blocks either before or after insertion into the database 12. External to the database 12, events are passed between processes in a standardized representation referred to herein as a Virtual Record. The Virtual Record is a standardized flat representation of an event in normalized format. The Virtual Record represents the externally accessible database columns of an event, in normalized format. The Virtual Record is the common data format for event detection system processes to exchange event information external to the database 12. The Virtual Record is also used to represent events that are detected within the audit stream by the event detection system. Thus, the Virtual Record represents a standard uniform format in which all events, be they detected or gathered from the audit source 18, are represented within the event detection system. An exemplary uniform format for the Virtual Record is shown below:

| Field | Type | Description |
| --- | --- | --- |
| evt_id | string | Source event Identity. |
| date_evt.month | short integer | Time stamp the event was generated, as recorded in audit record. Month Range (114 12). |
| date_evt.day | short integer | Day the event was generated, as recorded in audit record. Range (1–31). |
| date_evt.year | short integer | Year the event was generated, as recorded in audit record. Range (1990–2050). |
| date_evt.hour | short integer | Hour the event was generated, as recorded in audit record. Range (0–23). |
| date_evt.minute | short integer | Minute the event was generated, as recorded in audit record. Range (0–59). |
| date_evt.seconds | short integer | Second the event was generated, as recorded in audit record. Range (0–59). |
| user_account | string | Key to associated user account. |
| os | string | Operating system for which this is an event. |
| log_type | string | Type of log in which the event is recorded (e.g., "system", "security", "application"). |
| category | string | Category of the event (e.g., "privilege use", "object access"). |
| hw_name | string | Name of the hardware for which this is an account. |
| hw_description | string | Description of associated hardware. |
| status | string | Status or type of event (e.g., success, failure, information, warning, error). |
| extra_info | string | Additional information (e.g., effective user id) associated with the event. |
| exec_name | string | Application name associated with the event. |
| object_path | string | Path name and object name associated with the event. |
| evt_pid | integer | Process id associated with the event. |
| evt_desc | string | Description of mapped event. |
| filename | string | Name of audit file. |
| date_processed. month | short integer | The system time retrieved when an audit file is first opened for processing, the value should be the same for every audit record read from a given audit file. Month the event was processed. Range (1–12). |
| date_processed. day | short integer | Day the event was processed. Range (1–31). |
| date_processed. | short | Year the event was processed. |

-continued

| Field | Type | Description |
| --- | --- | --- |
| year | integer | Range (1980–2050). |
| date_processed. hour | short | Hour the event was processed. |
| hour | integer | Range (0–23). |
| date_processed. minute | short | Minute the event was processed. |
| minute | integer | Range (0–59). |
| date_processed. seconds | short | Second the event was processed. |
| seconds | integer | Range (0–59). |

The common unit of processing for audit data in the event detection system 10 is an event record. In order to present a coherent processing interface for data from many platform types, the event detection system must first convert event records into Virtual Records of the uniform format.

Virtual Records are inserted and stored in database tables. Database fields are normalized by reference to other tables. This allows complex data types, which may be stored repeatedly, to be included simply by index reference. For example, a 'user name' table contains the listing of user names, and events indexed into this table. This eliminates the duplication of user names within the database, saving a great deal of computer storage.

The process of converting audit data from its raw form into Virtual Records is referred to herein as audit parsing, or parsing. Audit parsing is broken down into several steps. Depending on the raw format of the event records, and the location of processing elements (there is a great deal of flexibility in locating processing elements), some steps may not be necessary in some variations and on some platforms. These steps are:

1. Acquisition or collection
2. Data movement
3. Parsing

A parser 20 performs the audit parsing, and has as its sole function the conversion of raw event records into Virtual Records. One potential exception to this rule are event records that have no security relevance. These can be identified during parsing or insertion into the database 12, and may be discarded immediately by the parser 20. This reduces downstream storage and processing overhead. Whether or not this exception should be implemented depends on the security policy established for a given organization. In some cases it may be desirable to have run time configurable control over which data is discarded in order to increase or decrease the number and types of events added to the database 12, e.g., to increase the number and types of events added to the database during a suspected intrusion attempt. An alternative is to purge unneeded Virtual Records from the database 12 after they have been created by the parser 20.

Strings in the Virtual Record are variable length objects, and are not length limited. String fields in the database 12 are limited to a maximum size defined by a database schema.

After the parser 20 performs audit parsing, an inserter 22 inserts the Virtual Records into the database 12.

The database 12 rejects any records for insertion for which a string is too long to fit in a corresponding database field. When a record is rejected the inserter 22 writes the rejected record to a file. In this way, the rejected information is not lost, and later determination as to why the rejected information was rejected can be made, and in some cases corrected. For example, a database administrator can adjust the size of a database field if its size is insufficient to hold normally sized data.

By way of example, a raw audit data format for Windows NT, available from Microsoft Corporation of Redmond Wash., is a binary format. When Windows NT opens an audit file, the file size is pre-allocated to 64 kb. If the Windows NT audit system uses all of the pre-allocated space in the file, the file size is extended in blocks of 64 kb. When Windows NT audit data is collected in a batch mode, a current audit file is closed in response to a request from a collector and a new audit file is opened. If this is done frequently, the resulting raw file storage requirements can be large (e.g., if an audit file is closed and a new audit file opened once per second, the daily raw storage requirement would be over 5.5 gigabytes per Windows NT platform being audited).

A lowest level method of audit acquisition is unique to each audit source 18, since the format of each audit source 18, and the interface to the operating system or application being audited is potentially unique.

As such, it may be necessary to acquire ancillary information 24 from a local system in order to fully interpret the audit data. This ancillary information 24 is referred to herein as local information 24.

An example of ancillary information 24 in a Windows NT environment is a table relating user codes to user names. When Windows NT generates audit data, instead of inserting a user name associated with each event into the audit data, a user code associated with each event is inserted into the audit data. Therefore, in order for the event detection system to determine the user name of the user with whom a particular event in the audit data is associated, the ancillary information 24 contained in such a table is required, because the user codes have no meaning outside the particular Windows NT platform on which the audit data is generated. Furthermore, across multiple Windows NT platforms, user codes may be used to identify different user names. Thus, this ancillary information 24 is important, at least in the present embodiment, to interpreting audit data from some audit sources 18, such as Windows NT generated audit data. This ancillary information 24, or local information 24, is used by the parser 20 to generate Virtual Records containing the user name.

The method of delivering the audit data to the next downstream process (which can be, for example, the parser 20) also has several possible variations. For example, audit data can be acquired and processed using either of the following modes: (a) batch mode; (b) real time mode. A batch mode configuration, and a real time mode configuration are illustrated in FIGS. 2 and 3, respectively.

Figure 2:
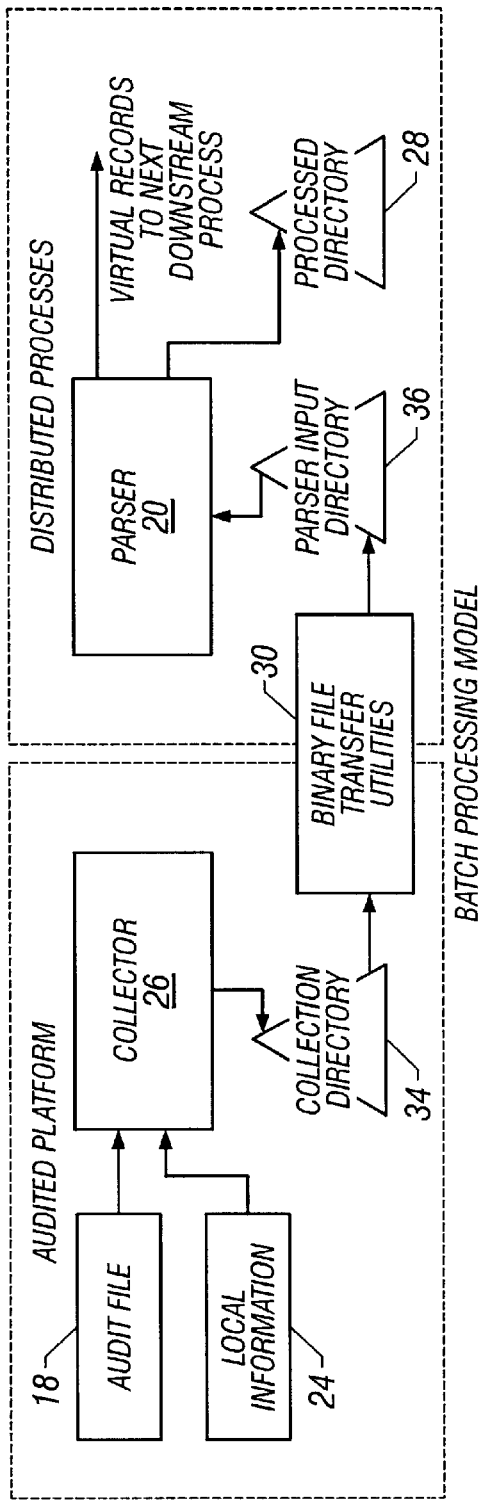
FIG. 2 is a schematic block diagram of a variation of the event detection system of FIG. 1 for operating in a batch processing mode.
Figure 3:
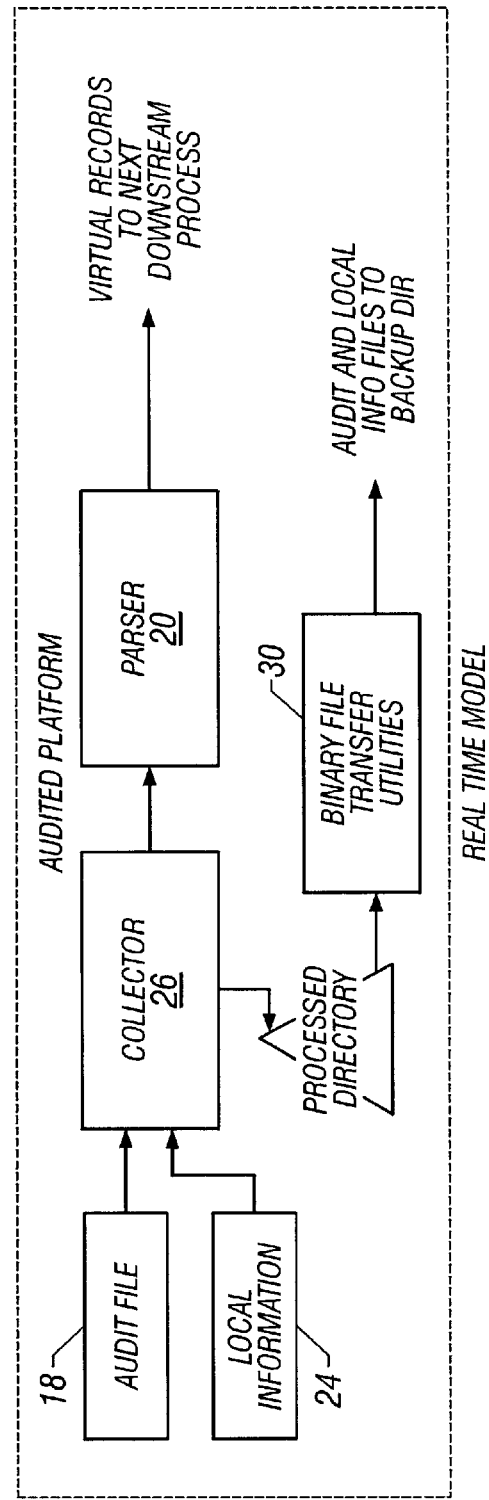
FIG. 3 is a schematic block diagram of a variation of the event detection system of FIG. 1 for operating in a real time processing mode.

Referring to FIG. 2, batch mode is the simpler of these two cases. In batch mode, the raw audit data file from the audit source 18 and possibly a local information file 24 are periodically passed by a collector 26 to a downstream process, e.g., the parser 20, that may be located on any platform accessible on a network. The raw audit data file from the audit source 18 is processed, with assistance from the local information file 24, in its entirety, and then closed, and optionally moved to a backup directory 28.

In batch mode, a set of generic file transfer utilities 30 (explained more fully below) is preferably used to deliver the raw audit data file from the audit source 18 and the local information file 24 from the collector 26, via, for example, a secure socket layer (SSL), to a downstream process location, where the parser 20 is located.

Referring to FIG, 3, in real time mode, the collector 26 monitors the raw audit data file from the audit source 18 and the local information file 24 in near real time for new information, and immediately acquires and forwards new audit data to the parser 20 for processing. In real time mode, the collector 26 and the parser 20 are preferably near the audit data source 18 (either as a process running on the same computer as the audit data source or, for example, on a computer on a common local area network as the audit data source computer, and the file transfer to the downstream process location, where the detector is located, includes the Virtual Records generated by the parser 20. Also, because the parser 20 is located near the audit data source 18, at least in one variation of the event detection system 10 (FIG. 1) of the present embodiment, the parser 20 preferably does not discard unwanted audit data. Instead, this unwanted audit data is removed from the database 12 (FIG. 1) after being inserted in the database 12 (FIG. 1) by the inserter 22 (FIG. 1).

In the real time mode, the audit data file is first opened and processed to its end. Then, the audit data file is periodically checked by the collector 26 for the existence of new audit data. When the collector 26 finds that there is new audit data in the audit date file, the new audit data is passed to the parser 20 in near real time.

The real time mode, in general, suggests close coupling between the process of acquisition (collector 26), parsing (parser 20), and in some embodiments, event detection (in a detector 32, which is discussed more completely hereinbelow). Thus, as mentioned above, the collector 26 and the parser 20 are generally near the audit source, i.e., processes executing on the same computer as, or, for example, on computers in a common local area network with the audit source) when the real time mode is employed. In some cases, when the risk of a local security breach is low, such as might be the case when user terminals are locked into single applications, and no command prompt access is available, the detector 32 (explained more completely hereinbelow) may also be at the audit source, i.e., the platform being audited, or otherwise near or closely coupled therewith.

Referring back to FIG. 1, a collector 26 operating in the real time mode may periodically close audit data files, and write them to a directory for backup/archival, in a manner similar to that in which the collector 26 operating in the batch mode also periodically closes audit data files, and writes them to a directory for backup. Alternatively, stand-alone programs or scripts may be used to close the audit data files periodically and move the closed audit data files to the directory for backup/archival.

The most platform dependent processes in the event detection system 10 are the collector 26 and the parser 20. The lowest level methods of audit acquisition are unique to each audit source 18, since the format of each audit source, and the interface to the operating system or application being audited is unique.

In accordance with the present embodiment, there is a different collector 26 for each operating system or application on a given platform. These different collectors 26 only concern themselves with acquiring audit data in raw file format from the audit source 18, and local information files 24; and with putting them in a collection directory 34, reserved for audit collection.

The method of delivering the audit data to the next downstream process also has some variations. In most cases, the next downstream process is the parser 20. The parser 20, for example in batch mode, may not be located on the same platform as the collector 26.

If the parser 20 is located on another platform, the files in the collection directory will be moved to an input directory 36 for the parser 20 by generic file transfer utilities 30. These generic file transfer utilities 30 are a collection of programs that periodically check a directory for files to be moved to another directory on, for example, another, remotely located, platform.

If the parser 20 is located on the same platform as the collector 26, such as, for example, in the real time mode, the collection directory can be used as the input directory for the parser 20. A processed directory for parser output is then checked by the generic file transfer utilities 30 for files to move to the next downstream process.

The generic file transfer utilities 30, in one embodiment, include a sender 38 that provides an ability to automate periodic transfer of files over a distributed network, be they raw audit data sent from the collector 26 at the audit data source 18 to the parser 20 at the downstream process location, Virtual Records sent from the parser 20 at the audit data source 18 to the detector 32 at the downstream process location, or Virtual Records sent from the detector 32 at the audit data source 18 to the inserter 22 at the downstream process location.

In a variation where the parser 20, detector 32, and inserter 22 are all located at the downstream process location, and the collector 26 is located at the audit source 18, the sender 38 collects audit data files placed in a specified directory 34 on a source platform 39 (client) by the collector 26, and transfers them across a network 40 to, for example, specified directories 36, which are unique to each file extension (i.e., audit file type), on a destination platform 42 (server). The parser 20 monitors the specified directories 36 for audit data files, and, when audit data files are detected, parses the audit data files from the specified directories 36 in accordance with the their file extension.

Audit data files are either backed up to a local directory 44 or deleted after they are transferred over the network.

The sender 38 obtains its configuration on startup from a Windows NT Registry (NT), or from a configuration file (Unix).

The actual file transfer is performed using services 46, 48 similar to file transfer protocol (FTP), which is commonly known in the art and well documented. These services 46, 48 are provided by a set of inter-related client/server utilities (collectively referred to herein as ORB_FTP) using CORBA ORBS to make a connection across the network. CORBA is the Common Object Request Broker Architecture, a product of the Object Management Group Consortium of Framingham, Mass. CORBA allows system-to-system communication via a collection of services for creating, deleting, and accessing objects. An ORB (object Request Broker) is an instance of a service provider, and is implemented as a callable process.

The ORB_FTP program 46 is spawned by a calling program, such as the sender 38, at the audit data source 18. All parameters needed by the ORB_FTP program 46 are passed in by the calling program. The ORB_FTP program 46 will make a CORBA connection to a program named ORB_FTP_RCV 48 at the downstream program location, and transfer the audit data file to a specified directory 36 at the downstream program location.

The parser 20 should handle the raw audit data files in such a way that errors in raw audit data record format are self re-synchronizing. If the audit data record format is unrecoverable, the raw audit data file should be closed and moved to the processed directory 44 for later review.

The record and/or line number in the raw audit data file where the fault or recovery was encountered should be reported to the event detection system 10. If a raw audit data file is closed due to a retry limit being reached or an unrecoverable error, such condition should also be reported to the event detection system 10. Connection failures and resource faults should also be reported, and the offending raw audit data file closed. The raw audit data file should not be moved to the processed directory 44, so the raw audit data file can be reprocessed later when the required resource or connection is available.

Expert system engines are at the heart of the event detection system application model. It is here that, in some embodiments, the security engineering model is implemented. Expert system engines can provide two types of information, meta-data (data about existing events), and derived events (new events resulting from patterns of evidence). Expert systems can also transform data into different formats, such as the collection of statistical profiles from event records. In the present embodiment, the expert system is implemented in the detector 32 first mentioned above.

The location of expert system engines within the event detection system 10 is distributed through sequential audit analysis by a variety of expert system engines, which can take many forms. The expert system engines can be generally stated as being any point in the event detection system 10 wherein security policy or other detection policy is implemented.

Event detection system expert system engines fall into several categories: (a) database derived information; (b) rule-based processors; (c) statistical processors.

Following lexical processing, a number of rule-based processes may be applied to Virtual Records to derive data or new events. In some cases derived data is meta-data (data about an instance of an event). This type of data may be used to update or populate fields in the Virtual Record. In other cases, rule-based processing results in the derivation of new events. As a matter of policy, if rule based processing generates information that goes beyond meta-data, data, a new event should be derived, and a corresponding Virtual Record should be generated.

In the present embodiment, there are six, standard, defined severity levels, one of which is assigned to each Virtual Record.

| Level | Meaning |
| --- | --- |
| 0 | Irrelevant or undefined |
| 1 | Potentially significant event |
| 2 | Interesting event |
| 3 | Significant event |
| 4 | warning |
| 5 | Alert |

Rule-based processing varies in complexity, and may be distributed throughout the expert systems, i.e., throughout the detector 32. These rule-based processors may be stand alone or may be closely coupled to other processes within the detector 32. Rule-based processes may be inline with the insertion path of Virtual Records into the database, or may read Virtual Records from the database 12 for input. A hybrid architecture, where Virtual Records are analyzed both inline, by some rule-based processes, and as read from the database 12, by other rule-based processes, can thus be employed consistent with the present embodiment. In variations of the present embodiment, either inline or database architectures are employed.

Rule-based processes utilize their pattern matching capabilities to detect attack signatures. An attack signature is a defined pattern of input data. Attack signatures have varying levels of complexity, and may span single or multiple events. Attack signature detection may also require maintaining state information due to the fact that the multiple events may span a considerable period of time, and the state of the discovery must be maintained. The following table illustrates three levels of complexity applicable to rule-based processes:

| Type | Signature Derivation |
| --- | --- |
| Simple | Single event, and Single criteria. No state information required, may be detected in one pass with lexical or rule based processors. |
| Complex | Single event, and Multiple criteria. No state information required (beyond the event record boundary), may be detected in one pass with rule based processors. |
| Derived | Multiple data sources or Multiple events. State information required, may be detected with rule based or statistical processors. Multi-pass processing may be required. |

Simple rule-based processing is applied to event records on insertion into the database. In this case, static database tables are referenced to populate meta-data fields in the Virtual Record. Information such as the event detection system event number and severity level are derived by this method. At any stage of event processing, meta-data may be derived.

Derived rule-based processing provides much of the meta-data about security events. When an event is inserted into the database 12, the relational database 12 provides table relationships that map meta-data. In the event detection system 10 this feature is exploited both to provide amplifying information and to reduce storage requirements. An exemplary case is the pattern of three unsuccessful logins by the same user. Each login attempt requires state information to be kept on the number of unsuccessful attempts, and the name of the user.

The event detection system uses database table relationships to store events and to map event instance data to meta-data. Below is an exemplary summary of the tables that may be used by the event detection system database 12.

| Table Name | Description |
| --- | --- |
| AUDIT_EVENT | Primary event table. Contains unique event instance information. |
| EVENT_SET | Raw Event information, which is consistent across identical raw event types. When a previously unknown event type is inserted into the database, its common information is added to this table. The severity level may be user modified. |
| EVENT_MAP | Contains information which maps raw event types to Event detection system events. |
| USER_ACCOUNT | Maps the user ID of a specific platform to the user information. |
| HARDWARE | Maps the hardware name to its description and location. |
| NETWORK | Maps network information to its identifier. |
| AUDIT_FILE | Maps information on the source audit file of an event. Periodically flushed when associated audit events are flushed. |
| EMPLOYEE | Maps employee information to employee ID. Must be manually populated. |

-continued

| Table Name | Description |
|---|---|
| LOCATION | Maps location information of an employee or hardware device. |
| NOTIFY | List of employees to notify in the event of an alert. |
| CRITICAL | List of those files which if accessed should generate an alert. |
| COLUMN_ATTRIBUTE | Contains column attributes for the user interface. |

There are three types of rule based processors in use by the detector 32: (1) hard coded rule-based processors; (2) execution array based processors; (3) rule-based interpreters.

Rule-based processing is used to process the following event detection system features: (a) rule based event signature detection; (b) access to critical files; (c) activity by tagged users; and (d) activity by users on a vacation list.

Hard coded processors consist of in-line code that implements a fixed security policy. The main advantage of hard coded processors is ease of implementation. Hard coded processors are sometimes justified where a fixed customized security policy is required, and the implementation schedule is short. The disadvantages are its inflexibility and lack of standardized methodology. This makes maintenance more difficult.

Execution array-based processors perform sequential signature detection on single event records, and may detect single or multiple "AND" criteria within an event. Execution array-based processors operate from an execution array in an Operator: Operand format. Execution array (process definition) may be static or dynamically loaded. Execution array-based processors may detect multiple signatures from a single event.

An execution array-based processor is a simple interpretive engine for signature matching. A typical engine of this type consists of an array of grouped Operator: Operand entries. Operators might be of comparison or search types such as "equals", "contains", or "end of signature". Operands typically contain either numeric or string types to be compared or searched for.

The most advantageous features of this type of engine are speed and simplicity. Typically this type of engine only supports "sequential AND" fact matching on single Virtual Records. Virtual records are sequentially compared to signatures containing one or more conditions, and matches result in some response being generated, typically a Virtual Record indicating an event being entered in the database 12 by the inserter 22. A signature match may or may not result in termination of processing for that record.

Execution array-based processors can be hard-coded by static initialization, but a text interpreter may be implemented for loading this type of engine, making them run-time configurable. An execution definition consists of a sequence of signature matching definitions.

Rule-based interpreters (expert system engines) are capable of pattern detection across multiple events; operate from a file based rule definition; use an interpretive language model; maintain state information by the assertion of persistent "facts"; and perform sequential signature matching on event records.

The event detection system of the present embodiment uses CLIPS, an off-the-shelf expert system engine developed by NASA for spacecraft use. CLIPS is a forward chaining expert system engine that operates by asserting "facts" into a fact base. A fact is a unique identifier associated with data. In this respect there is no discernable difference in concept between a CLIPS fact and an event in the context of the present embodiment, except that CLIPS facts have a different set of unique ID's, and use a different storage architecture.

CLIPS is an interpretive language signature matching system with its own volatile data storage area. The format of the event detection system's event record (i.e., the format of the Virtual Records) is registered with the CLIPS processor. CLIPS signature definitions are then sequentially compared with incoming events. When a signature match is found, a response is called. This response is typically entering a Virtual Record indicating an event into the database 12, or the assertion of a fact in the CLIPS fact-base. Sometimes a signature match results in facts being removed from the CLIPS fact-base.

For example, consider a set of rules that generates an alert on three failed logins. The rules for this alert are "three failed logins, by a user, at a platform, without an intervening successful login or system restart".

In this case CLIPS is programmed to use event detection system Virtual Records as an input source. CLIPS facts consist of Virtual Records stored with a CLIPS Fact ID. The rules for detecting three failed logins are grouped together and behave much like a program subroutine that can call other subroutines, and can be terminated early, if exit conditions are met.

For purposes of this example, three events, and two CLIPS facts are significant for detecting signatures and saving state.

| Event detection system Event | Matching data fields | | Action Taken |
|---|---|---|---|
| Failed login | User ID | Platform ID | If (Failed login AND not (ClipsFailedLogOne matching User ID and Platform ID) AND not (ClipsFailedLogTwo matching User ID and Platform ID)) {Assert ClipsFailedLogOne matching User ID and Platform ID} If (Failed login AND not (ClipsFailedLogTwo matching User ID and Platform ID) AND (ClipsFailedLogOne matching User ID and Platform ID)) {Assert ClipsFailedLogTwo matching User ID and Platform ID} If (Failed login AND (ClipsFailedLogOne matching User ID and Platform ID) AND (ClipsFailedLogTwo matching User ID and Platform ID)) |

-continued

| Event detection system Event | Matching data fields | | Action Taken |
|---|---|---|---|
| Successful login | User ID | Platform ID | If (Successful login) {Retract ClipsFailedLogOne matching User ID and Platform ID Retract ClipsFailedLogTwo matching User ID and Platform ID} |
| System restart | Ignore User ID | Platform ID | If (System restart) {Retract all ClipsFailedLogOne matching Platform ID Retract all ClipsFailedLogTwo matching Platform ID} |

A successful login or system restart results in the collected failed login facts associated with the user and/or platform being thrown away. Collection of enough failed login facts triggers a derived event.

Below is an example of part of some CLIPS code for three failed login detection.

```
; Three failed passwords
; Event detection system Event #2161
; The next three rules detect three failed passwords
for the same user on the same target;
(defrule passwd1
    ?index <— (2161 ?username ?hostname ?status ?time
?cnode ?userid ?object ?execname)
    (not(passwdf1 ?username ?hostname))
    (not(passwdf2 ?username ?hostname))
=>
    (retract ?index)
    (assert (passwdf1 ?username ?hostname)))
(defrule passwd2
    ?index <— (2161 ?username ?hostname ?status ?time
?cnode ?userid ?object ?execname)
    (not(passwdf2 ?username ?hostname))
    (passwdf1 ?username ?hostname)
=>
    (retract ?index)
    (assert (passwdf2 ?username ?hostname)))
(defrule passwd3
    ?index <— (2161 ?username ?hostname ?status ?time
?cnode ?userid ?object ?execname)
    ?index2 <— (passwdf1 ?username ?hostname)
    ?index3 <— (passwdf2 ?username ?hostname)
=>
    (retract ?index)
    (retract ?index2)
    (retract ?index3)
    (alert 8 "Password Failures" ?cnode ?userid ?time
?execname ?object 0))
```

Statistical processors are used to process the following Event detection system features: collect statistical data by category, user, and platform; and analyze statistical data and detect events based on statistical profiles.

Implementation of statistical processing in the event detection system 10 requires design and implementation of two components. The first is a design of a database schema to permit the storage of statistical data by the following key parameters: event category; user; platform; and interval.

The event detection system statistical process operates by tabulating events by categories resolved by user, platform, and interval. After a defined collection period for statistical profiling (typically three months), the statistical processor starts comparing short term category counts with the longer term profiles for deviations from a statistical profile, typically using mean and standard deviation calculations.

The statistical mean and standard deviation are calculated across the database of events associated with each user and category based on daily activity. A threshold for the maximum amount of activity is calculated as a user-defined multiple of the standard deviation away from the mean. These threshold numbers associated with each user and category, are passed to the detector 32. The detector 32 counts events as they arrive to see if one of the thresholds is exceeded. If a threshold is exceeded, a high severity event is generated and passed to the inserter 22 for storage in a Virtual Record in the database 12.

The database schema should support adding or deleting event categories, users, or platforms to/from the database 12. The database model should support automatic on-the-fly addition of new categories, users, or platforms. The database schema should also support changes to the interval (granularity) of statistical resolution. Depending on whether the interval is being increased or decreased, a statistical profiling period may have to be restarted after a change to the interval schema format.

Statistical processing may be implemented as two separate processes for counting and analysis. Or, the same process that tabulates event categories could be used to perform on-the-fly analysis. The overhead tradeoffs related to on-the-fly analysis should be considered in this decision. A batch analysis model, running less frequently, could result in significantly lower processing overhead.

The analysis process should be an executing process(es) to detect and generate derived statistical events based on defined statistical criteria.

The event detection system 10 is preferably implements a generalized object-oriented statistical processor. This statistical processor supports run-time configurable statistical process definitions, which allows the statistical processing to be modified by loading new process definitions based on newly defined requirements.

The inserter 22 accepts Virtual Records from both the parser 20 and the detector 32. Virtual Records indicating events from the parser 20 and detector 32 are inserted into the database by evoking the open database connectivity (ODBC) software that interfaces to the database 12. Virtual Records from the parser 20 are also passed to the detector 32 to allow it to scan the events for attack signature matches or for statistical anomalies.

The event detection system user interface 16 is implemented through a set of graphical user interfaces (GUI): a manager/configuration GUI provides centralized configuration, administration, access permissions, built in test, and component status capabilities for event detection system 10; and an auditor/investigator GUI provides the primary application interface of the event detection system.

The manager/configuration GUI can be used to configure and administrate all event detection system components. The objective of the manager/configuration GUI is to provide an integrated interface for the configuration, status, and built in test of all event detection system components. The event detection system administrator should not be required to understand the details of the underlying architecture in order to install and maintain the event detection system 10 in a standard configuration.

The major functional areas that are addressed by the manager/configuration GUI are as follows: life cycle control; define and load executable versions of any distributed event detection system components; configure distributed event detection system components; define the logical connectivity and configuration of all distributed event detection system components; display and update the event detection system configuration in graphical and tabular format as appropriate; perform automated configuration consistency checks; load configuration data in the configuration database for automatic configuration update of distributed components on startup; allow sending immediate configuration update to distributed components (configure audit data collection, configure audit data transfer timing, configuration validation, maintain event database tables, configure automatic database record purging by severity level and length of time since the data was processed into the database, and manual database record management, purge, archive, restore); and provide a GUI interface for maintenance of static database tables, such as, event set, event map, user account, employee, etc. (configure database triggers, configure rule based triggers, configure statistical categories, configure critical files, configure sectors, configure tagged users, configure vacation list, configure mail addresses, and configure minimum profiles).

The major functional areas that are addressed by the auditor/investigator GUI are as follows: manual raw audit file management, archive/restore; configure automated audit file archive; and maintenance of an audit file archive database; event detection system user identification and authentication; database connectivity with filter and sort capabilities for selecting and displaying event data in tabular format; an indicator on a tabular GUI display window to indicate when filtering is active; user interface for saving and selecting multiple filter and sort templates (setups) by user defined names (these saved setups are associated with the user, and are available when the user logs in to event detection system); allowing each authenticated user to save a default GUI setup, including the default filter and sort setup; an event status bar for graphical display of the highest event severity level, which has not yet been observed (after the initial observation of an event in the tabular display, the status bar will no longer use that event to update the status bar); user interface allowing the user to mark selected datasets in the database as "responded to" (events that have been responded to, will no longer be displayed in the default event display mode, but may be re-selected for display through a filter); print selected datasets; export selected datasets to a file; display selected datasets in chart form; display the status of distributed event detection system executables; display and print charts, including bar charts (n selected items horizontal, by value vertical, or n selected items horizontal, by m selected items deep, by value vertical from a currently filtered data set); creating chart templates; saving chart templates by name; creating a statistical template for a statistical viewer; saving statistical templates; displaying and printing statistical data, and statistical charts; viewing user status, including login status of user(s), vacation/tagged user status; and default data set filtering for selected users.

Also incorporated into the auditor/investigator is a workstation status viewer, and a process status viewer. The workstation status viewer enables the user to view connected/disconnected workstation status; and view sector configuration. The process status viewer enables the user to view process status; and view process configuration; and display the status of distributed executables of the event detection system.

User interface access to the event detection system database is provided through a process referred to herein as the GUI reader. The GUI reader provides a standardized database access application program interface (API) for the event detection system GUIs, such as the manager/configuration GUI and the auditor/investigator GUI, regardless of the underlying database in use. The GUI reader provides the following services to the Event detection system GUIs: identification and authentication for database connection; database connection management; database schema independence; read/write access control to database columns; and database query interface.

Installation utilities 50 provide a stand alone capability, through scripts and/or installation programs (such as INSTALL SHIELD, available from Install Shield Corporation of Schaumburg, Ill. or other such readily available installation products readily available commercially), to get a minimum event detection system application up and running on agents (clients) or managers (servers). The installation utilities 50 are preferably of a quality and ease of use that is sufficient for a non-expert user to get a minimum standard configuration running with minimum difficulty.

The Windows NT registry may used to store configuration parameters for stand alone event detection system executable components.

The inserter 22 utilizes a commercially available database engine at the core of its data storage requirements. For example, the event detection system may utilize Oracle from Oracle Corporation, or Sybase from Sybase, Inc. or Access or Microsoft SQL from Microsoft of Redmond, Wash. or any of a number of commercially available database management systems to provide database services to the event detection system 10.

The inserter 22 is preferably designed to allow the use of a wide variety of relational databases through standard Structured Query Language (SQL) queries and open database connectivity (ODBC) connections. (The installation utilities 50 assume that a database management system compatible with the event detection system 10 is already installed prior to starting installation of the remainder of the event detection system 10.)

A schema for the database 12 is preferably compatible across all database tables that have been integrated with the event detection system 10. A set of utilities may be provided to automate creation of the database schema, create database tables, and populate static tables with default information to provide minimum standard database functionality and connectivity.

As suggested by the above description, the event detection system 10 application is designed to run in a distributed environment. Processes are designed to permit transparent object connectivity across networks with few restrictions on the location of processes. Most processes have a configuration, which defines all parameters that the process needs to perform its normal functions. In general, processes running on Windows NT platforms may get their configuration from the Windows NT Registry, and executables on Unix platforms may get their configuration from a configuration file. The event detection system configuration in the Windows NT Registry may be generated by reading a configuration file that is identical to the one that would be used on a Unix platform, if such process were running on a Unix platform. There is usually only one event detection system configuration file for all event detection system processes (or executables) on a given platform. In some cases, event detection system processes may be registered CORBA services that are automatically launched on request by an Object Activation Daemon (OAD) which calls the process. Alternatively, event detection system processes may be launched as a part of startup processes for the platform on which the processes are to be run. In either case a manager 52 is responsible for process startup.

In order to maintain security between the many processes making up the event detection system 10, communications between processes may be encrypted, such as by using a secure sockets layer (SSL), and may similarly be digitally signed, to assure that information and instructions from a sending process are authentic.

Another task implemented in the processes of the event detection system 10 is fault management. Fault management is partitioned into two activities: reporting and response. Fault responses should be made locally, at the application level, unless there is a specific alternate procedure defined for responding to the fault. Usually, only the process that detects the fault is sufficiently closely coupled to the fault's particular fault condition to recover.

Faults and recoveries should be reported to the database 12.

File format fault handling should be designed so that errors are self re-synchronizing. If the file format is unrecoverable, the file should be closed and moved to the processed directory. The record and/or line number in the file where the fault or recovery was first encountered should be reported to the centralized reporting service. Sequential record format failures should not be individually reported. If a file is closed due to retry limit or unrecoverable error, this should be reported to the database.

An exemplary file format fault recovery task is as follows: (1) file format error detected; (2) report record and/or line number in the file where the first fault was encountered to the database; (3) continue attempting to process the file, until recovery, retry limit, or end of file; (4) report record and/or line number in the file where the recovery was encountered to the database; (5) continue processing records, after recovery; (6) report file closed due to retry limit or unrecoverable error to the centralized reporting service; and (7) on closing the file, move it to the processed directory.

Another fault that should be handled by the fault recovery task is a connection failure. Connection failures can usually be identified as CORBA exception errors. This type of fault should generally be reported, and the offending file closed. The file should not be moved to the processed directory, so that it can be reprocessed later.

An exemplary connection failure fault recovery task is as follows: (1) report connection failures to the centralized reporting service; and (2) close the file, do not move it to the processed directory.

A further type of fault that should be handled by the fault recovery task is a resource fault, i.e., an error related to platform resource availability or accessibility. An exemplary resource fault recovery task is as follows: (1) report connection failures to the centralized reporting service; and (2) if the resource failure results in failure to process an audit file, close the file, do not move it to the processed directory.

If the database is unavailable, faults should be logged to a local log file on the local disk. The log file size should be limited. If the maximum file size is reached, fault logging should be terminated. If the connection with the database is re-established, the local log file should be processed for reporting to the database 12.

While the invention herein disclosed has been described by means of specific embodiments and applications thereof, numerous modifications and variations could be made thereto by those skilled in the art without departing from the scope of the invention set forth in the claims.

Specifically, for example, the present invention may find application in such fields as earthquake detection, where either rule-based processing or statistical processing, or a combination thereof may prove advantageous in the detection and prediction of earthquakes based on event information collected from a number of widely distributed sites.

Likewise, the present invention may find application in the detection of anomalies in the movement of vehicles or personnel that may signify violations, theft, or other events of importance to a user. In such example, GPS receivers carried by the vehicles or personnel may be used to provide event information that is transmitted back to a downstream processing location, where either rule-based processing or statistical processing or both is performed in the event information from the GPS receivers.

What is claimed is:

1. A system for event detection comprising:

a collector operable to collect raw audit data comprising raw audit data records, the collector being at a first audit source having a first type of operating system;

a database;

an inserter, in communication with the database, operable to insert Virtual Records into the database, including both a first type of Virtual Record generated in response to a raw audit data record, and a second type of Virtual Record generated in response to a detected audit event;

a parser, in communication with the collector and the inserter, operable to convert raw audit data records in the raw audit data into Virtual Records of the first type, wherein the Virtual Records of the first type are generated in a normalized format, the normalized format having a plurality of data fields, each data field corresponding to a different category of data associated with a potential audit event, the parser converting the raw audit data records into Virtual Records of the first type by parsing the raw audit data records to identify the different categories of data for storage within the data fields; and a detector, in communication with the parser and the inserter, operable to detect audit events in response to analyzing data arranged according to the normalized format in the Virtual Records of the first type, the detector operable to generate the second type of Virtual Record in the event one of the audit events is detected, the detector further operable to detect audit events in response to analyzing data arranged according to the normalized format in additional Virtual Records of the first type, the additional Virtual Records being converted from additional raw audit data records collected at a second audit source, the second audit source having a second type of operating system.

2. The system of claim 1 further comprising:

a sender in communication with at least one of the collector, the parser, and the detector, the sender operable to send output data from the at least one of the collector, the parser, and the detector to the inserter.

3. The system of claim 2 wherein said sender includes an encryptor for encrypting output data from said at least one of the collector, the parser, and the detector before said output data is sent to the inserter.

4. The system of claim 2 wherein the sender is coupled to the collector, at the first audit source, and is operable to send Virtual Records of the first type from the collector to the parser, the parser being located, at a downstream process location.

5. The system of claim 2 wherein the sender is coupled to the parser, at the first audit source, and is operable to send Virtual Records of the first type from the parser to the detector, the detector being located at the downstream process location.

6. The system of claim 2 wherein the sender is coupled to the detector, at the audit source, and wherein the inserter is located at the downstream process location.

7. The system of claim 1 wherein an input of said detector is coupled to an output of said parser, and wherein the detector detects audit events in response to the Virtual Records of the first type generated by the parser and generates Virtual Records of the second type in response thereto.

8. The system of claim 1 wherein an input of said detector is coupled to an output of said inserter and where the detector detects audit events in response to analyzing Virtual Records of the first type from the inserter and generates Virtual Records of the second type in response thereto.

9. The system of claim 8 wherein an output of said detector is coupled to an input of said inserter wherein Virtual Records of the second type are sent from the detector to the inserter.

10. The system of claim 1 wherein an input of said detector is coupled to an output of said database, and wherein said detector detects audit events in response to the Virtual Records of the first type in the database and generates Virtual Records of the second type in response thereto.

11. The system of claim 10 wherein an output of said detector is coupled to said inserter, wherein Virtual Records of the second type generated by the detector are inserted into the database by the inserter.

12. The system of claim 1 herein said collector collects local information from said first audit source, along with said audit data.

13. The system of claim 1 wherein said database is a relational database.

14. The system of claim 13 further comprising:
a user interface coupled to the database, the user interface having a filter operable to filter Virtual Records in the database based on a filter criteria.

15. The system of claim 1 wherein said detector comprises:
a processor operable to perform a rule-based analysis of the Virtual Records of the first type generated by the parser.

16. The system of claim 1 wherein said detector further comprises:
a processor operable to perform a statistical analysis of the Virtual Records of the first type generated by the parser.

17. The system of claim 16 wherein said detector further comprises:
a processor operable to determine a mean and a standard deviation of a parameter in a set of said Virtual Records, and further operable to detect in a subsequent Virtual Record whether the parameter is more than a predetermined multiple of the standard deviation away from the mean.

18. The system of claim 17 wherein said detector comprises:
a processor operable to perform a rule-based analysis of the Virtual Records generated by the parser.

19. The system of claim 1 wherein said raw audit data is a security log generated by a computer operating system.

20. A method of event detection comprising:
collecting raw audit data at an audit source, the raw data comprising raw audit data records;

parsing the raw audit data records by converting each raw audit data record into a Virtual Record of a first type, the Virtual Records of the first type being arranged according to a normalized format, the normalized format having a plurality of data fields, each data field corresponding to a different category of data associated with a potential audit event, the parsing including converting the raw audit data records into Virtual Records of the first type by parsing the raw audit data records to identify the different categories of data for storage within the data fields;

detecting audit events in response to analyzing the different categories of data included in the Virtual Records;

generating a Virtual Record of a second type in response to each detected audit event; and storing the Virtual Records of the first type and the Virtual Records of the second type.

21. The method of claim 20 further comprising:
encrypting the Virtual Records of the first type.

22. The method of claim 20 wherein said detecting comprises detecting audit events in response to retrieving the stored Virtual Records of the first type.

23. The method of claim 20 wherein said detecting comprises detecting audit events in response to Virtual Records and event signatures.

24. The method of claim 20 wherein said detecting comprises detecting audit events in response to Virtual Records and a statistical analysis.

25. The method of claim 20 further comprising filtering the stored Virtual Records of the first type using a user interface.

26. The method of claim 20 wherein said detecting comprises performing rule-based analysis on the Virtual Records.

27. The method of claim 20 wherein said detecting comprises performing statistical analysis in the Virtual Records using audit data associated with a plurality of types of audit sources.

28. The method of claim 27 wherein said performing statistical analysis comprises:
determining a mean and a standard deviation of a parameter in a set of Virtual Records; and
determining whether in a subsequent Virtual Record the parameter is more than a predetermined multiple of the standard deviation away from the mean.

29. The method of claim 28 wherein said detecting further comprises performing rule-based analysis on the Virtual Records.

30. A method of event detection, the method comprising:
collecting raw audit data at a first audit source having a first type of operating system, the raw audit data having one or more raw audit data records;
collecting additional raw audit data at a second audit source having a second type of operating system, the additional raw audit data having one or more additional raw audit data records;
converting each of the raw audit data records and additional raw audit data records into a Virtual Record, the Virtual Record being organized using a normalized format, the Virtual Record being populated with data from the raw audit data record in response to the type of operating system of the audit source associated with the raw audit data records;
communicating the Virtual Records to a detector; and detecting audit events in response to the detector receiving the Virtual Records, wherein the detector detects audit events in response to performing signature analysis on the Virtual Records converted from the raw audit data records and the additional raw audit data records, and wherein the detector further detects audit events in response to performing statistical analysis on the Virtual Records as compared to previously stored Virtual Records.

31. The method of claim 30, wherein detecting audit events further comprises detecting audit events wherein the detector is located at a different node of the network from the first and second audit sources.

32. A method of event detection, the method comprising:

collecting raw audit data at a first audit source having a first type of operating system, the raw audit data having one or more raw audit data records;

collecting additional raw audit data at a second audit source having a second type of operating system, the additional raw audit data having one or more additional raw audit data records;

converting each of the raw audit data records and additional raw audit data records into a Virtual Record, the Virtual Record being organized using a normalized format, the Virtual Record being populated with data from the raw audit data record in response to the type of operating system of the audit source associated with the raw audit data records;

communicating the Virtual Records to a detector; and detecting audit events in response to the detector receiving the Virtual Records, wherein the detector detects audit events in response to performing signature analysis on the Virtual Records converted from the raw audit data records and the additional raw audit data records, and wherein the detector further detects audit events in response to performing statistical analysis on the Virtual Records as compared to previously stored Virtual Records, wherein detecting audit events further comprises detecting audit events in response to combining a first set of data associated with the first type of operating system with a second set of data associated with the second type of operating system.

33. A method of event detection, the method comprising:

collecting raw audit data at a first audit source having a first type of operating system, the raw audit data having one or more raw audit data records;

collecting additional raw audit data at a second audit source having a second type of operating system, the additional raw audit data having one or more additional raw audit data records;

converting each of the raw audit data records and additional raw audit data records into a Virtual Record, the Virtual Record being organized using a normalized format, the Virtual Record being populated with data from the raw audit data record in response to the type of operating system of the audit source associated with the raw audit data records;

communicating the Virtual Records to a detector; and detecting audit events in response to the detector receiving the Virtual Records, wherein the detector detects audit events in response to performing signature analysis on the Virtual Records converted from the raw audit data records and the additional raw audit data records, and wherein the detector further detects audit events in response to performing statistical analysis on the Virtual Records as compared to previously stored Virtual Records, wherein detecting audit events in response to performing signature analysis includes maintaining and monitoring state information.

34. The method of claim 33, wherein detecting audit events further comprises accessing a database of audit events.

35. The method of claim 33, wherein detecting audit events further comprises accessing a database of audit events, the database being configurable by a user to add or delete categories used to identify audit events.

36. The method of claim 35, wherein the categories include users, platforms, events, and intervals.

37. A method of event detection, the method comprising:

collecting raw audit data at a first audit source having a first type of operating system, the raw audit data having one or more raw audit data records;

collecting additional raw audit data at a second audit source having a second type of operating system, the additional raw audit data having one or more additional raw audit data records;

converting each of the raw audit data records and additional raw audit data records into a Virtual Record, the Virtual Record being organized using a normalized format, the Virtual Record being populated with data from the raw audit data record in response to the type of operating system of the audit source associated with the raw audit data records;

communicating the Virtual Records to a detector;

detecting audit events in response to the detector receiving the Virtual Records, wherein the detector detects audit events in response to performing signature analysis on the Virtual Records converted from the raw audit data records and the additional raw audit data records, and wherein the detector further detects audit events in response to performing statistical analysis on the Virtual Records as compared to previously stored Virtual Records; and wherein the method is conducted using transparent object connectivity.

38. The method of claim 33, wherein communicating the Virtual Records further comprises encrypting the Virtual Records prior to communication.

39. The method of claim 33, wherein the raw audit data records each include audit data associated with an event or portion of an event taking place at the first audit source.

40. The method of claim 33, wherein converting each of the raw audit data records further comprises accessing ancillary information from a local system associated with the first audit source.

41. The method of claim 33, wherein communicating the Virtual Records further comprises communicating the Virtual Records in real-time upon conversion.

42. The method of claim 33, and further comprising archiving the raw audit data records.

* * * * *